(12) United States Patent
Sena et al.

(10) Patent No.: US 9,827,705 B2
(45) Date of Patent: Nov. 28, 2017

(54) HIGH GLOSS HIGH DENSITY POLYETHYLENE CONTAINERS

(71) Applicant: The Procter & Gamble Company, Cincinnati, OH (US)

(72) Inventors: Douglas David Sena, Wyoming, OH (US); Huberto Miel Dalisay, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 110 days.

(21) Appl. No.: 14/688,227

(22) Filed: Apr. 16, 2015

(65) Prior Publication Data

US 2016/0303790 A1 Oct. 20, 2016

(51) Int. Cl.

| | |
|---|---|
| *B29C 49/22* | (2006.01) |
| *B29C 49/00* | (2006.01) |
| *B29C 33/38* | (2006.01) |
| *B29C 49/04* | (2006.01) |
| *B29C 49/06* | (2006.01) |
| *B29K 105/00* | (2006.01) |
| *B29L 31/00* | (2006.01) |
| *B65D 1/02* | (2006.01) |
| *B29C 33/42* | (2006.01) |
| *B65B 3/02* | (2006.01) |

(52) U.S. Cl.
CPC ...... *B29C 49/0005* (2013.01); *B29C 33/3842* (2013.01); *B29C 49/22* (2013.01); *B29C 49/221* (2013.01); *B29C 33/42* (2013.01); *B29C 49/04* (2013.01); *B29C 49/06* (2013.01); *B29C 2049/001* (2013.01); *B29K 2023/06* (2013.01); *B29K 2105/0005* (2013.01); *B29K 2995/0022* (2013.01); *B29K 2995/0073* (2013.01); *B29L 2031/7158* (2013.01); *B65B 3/022* (2013.01); *B65D 1/0207* (2013.01); *B65D 1/0215* (2013.01)

(58) Field of Classification Search
None
See application file for complete search history.

(56) References Cited

U.S. PATENT DOCUMENTS

| | | | |
|---|---|---|---|
| 5,643,646 A * | 7/1997 | Spence | ................ B65D 1/0207 |
| | | | 206/524.6 |
| 6,900,550 B2 | 5/2005 | Yamazaki | |
| 6,911,720 B2 | 6/2005 | Yamazaki | |
| 7,514,130 B2 | 4/2009 | Maziers | |
| 7,531,594 B2 * | 5/2009 | Lin | .......................... C08K 5/01 |
| | | | 524/474 |
| 8,338,540 B2 * | 12/2012 | van Riel | ................ C08F 297/08 |
| | | | 524/529 |
| 2001/0048988 A1 * | 12/2001 | Forte | ................... B29C 49/0005 |
| | | | 428/35.7 |
| 2004/0121098 A1 | 6/2004 | Maziers | |
| 2004/0126520 A1 | 7/2004 | Samarcq | |
| 2010/0261016 A1 * | 10/2010 | Radermacher | ...... B29C 45/0001 |
| | | | 428/409 |
| 2012/0068385 A1 | 3/2012 | Maziers | |

FOREIGN PATENT DOCUMENTS

JP 5883234 B2 3/2016

OTHER PUBLICATIONS

PCT International Search Report and Written Opinion for PCT/US2016/027772 dated Jun. 17, 2016.

\* cited by examiner

*Primary Examiner* — Robert B Davis
(74) *Attorney, Agent, or Firm* — Linda M. Sivik

(57) ABSTRACT

The present invention is directed to a process for making a low coefficient of friction (COF) high gloss polyolefin bottle by the following: a) adding a high gloss metallocene polyethylene during a manufacturing process on the outer layer of a container; b) adding a slip agent on the outer layer of the container wherein the container has a gloss range greater than 60 gloss units with a coefficient of friction of less than 0.25.

13 Claims, 4 Drawing Sheets

| Resin type | HDPE | HDPE | HDPE | HDPE | HDPE | HDPE | PET (control) |
|---|---|---|---|---|---|---|---|
| % HG resin | 0% | 0% | 50% | 50% | 100% | 100% | n/a |
| Mold finish | M5 | HP | M5 | HP | M5 | HP | HP |
| Gloss Units | 17 | 16 | 63 | 73 | 77 | 87 | 105 |
| Pictures | | | | | | | |
| Example | Example 2 | Example 1 | Example 6 | Example 5 | Example 8 | Example 7 | Example 25 |

Fig. 5

HIGH GLOSS HIGH DENSITY POLYETHYLENE CONTAINERS

FIELD OF THE INVENTION

The present invention relates to a process of making packages with high gloss finish and low coefficient of friction surfaces. The packages comprise of (a) polyolefins made by polymerization reactions using metallocene catalyst and (b) a slip agent.

BACKGROUND OF THE INVENTION

High Gloss bottles provide a method to discriminate on shelf appearance amongst competitive packages. This may also send a message to the consumer that the hair care product provides a shiny hair benefit. The ultimate objective is to increase product sales by improving the attractiveness of the package at the time and moment that the consumer selects a product at the store shelf.

Package decoration and ways to increase the appeal of the bottles are important to the consumer. One typical way to increase attractiveness is the use of glossy bottles. A commonly used way to achieve that is by using polyethylene terephthalate (PET) polymer as the main packaging material. However, PET comes at about a 30% incremental cost. Therefore, there is a need for developing a technology to deliver HDPE high density polyethylene packages that deliver the same design intent of the high gloss PET packages. A common problem encountered in high speed packaging filling lines, where glossy bottles are involved is the reduced process reliability because of the high surface bottle friction (expressed as Coefficient of Friction—COF) observed in the case of glossy bottles. This is particularly relevant in the case where the bottles comprise of polyolefins that are produced using metallocene catalysts, a material that improves gloss. It is well known in the industry that for achieving high gloss the following parameters are important: (a) the selection of the appropriate metallocene resin and (b) the introduction of the pearls and colorants into the inner layer so as to not negatively impact the gloss.

Consequently, a need exists for a HDPE bottle with a high gloss finish that can be produced at high production rate, and that can be effectively filled, labeled, capped and handled at a high level of reliability.

SUMMARY OF THE INVENTION

The present invention is directed to a process for making a low coefficient of friction (COF) high gloss polyolefin bottle by the following: a) adding a high gloss metallocene polyethylene during a manufacturing process on the outer layer of a container; b) adding a slip agent on the outer layer of the container wherein the container has a gloss range greater than 60 gloss units with a coefficient of friction of less than 0.25.

BRIEF DESCRIPTION OF THE DRAWINGS

FIG. 5 contains pictures showing varying gloss retention on various containers.

DETAILED DESCRIPTION OF EMBODIMENTS OF THE INVENTION

Figure 1:
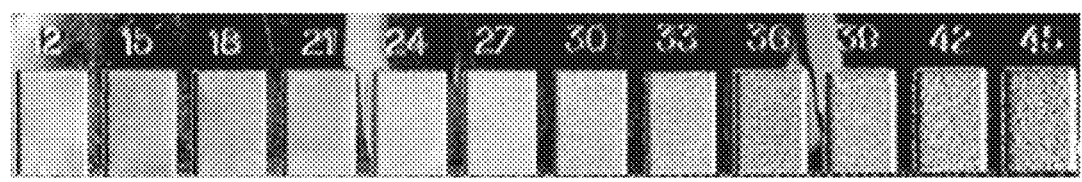
FIG. 1 is a picture showing several VDI (Verein Deutscher Ingenieure) mold finishes.

All percentages and ratios used herein are by weight of the total composition, unless otherwise designated. All measurements are understood to be made at ambient conditions, where "ambient conditions" means conditions at about 25° C., under about one atmosphere of pressure, and at about 50% relative humidity (RH), unless otherwise designated. All numeric ranges are inclusive of narrower ranges; delineated upper and lower range limits are combinable to create further ranges not explicitly delineated.

The compositions of the present invention can comprise, consist essentially of, or consist of, the essential components as well as optional ingredients described herein. As used herein, "consisting essentially of" means that the composition or component may include additional ingredients, but only if the additional ingredients do not materially alter the basic and novel characteristics of the claimed compositions or methods.

"Apply" or "application", as used in reference to a composition, means to apply or spread the compositions of the present invention onto keratinous tissue such as the hair.

"Dermatologically acceptable" means that the compositions or components described are suitable for use in contact with human skin tissue without undue toxicity, incompatibility, instability, allergic response, and the like.

"Safe and effective amount" means an amount of a compound or composition sufficient to significantly induce a positive benefit.

"Soluble" means at least about 0.1 g of solute dissolves in 100 ml of solvent, at 25° C. and 1 atm of pressure.

All percentages are by weight of the total composition, unless stated otherwise. All ratios are weight ratios, unless specifically stated otherwise. All ranges are inclusive and combinable. The number of significant digits conveys neither a limitation on the indicated amounts nor on the accuracy of the measurements. The term "molecular weight" or "M. Wt." as used herein refers to the weight average molecular weight unless otherwise stated. The weight average molecular weight may be measured by gel permeation chromatography. "QS" means sufficient quantity for 100%.

The term "substantially free from" or "substantially free of" as used herein means less than about 1%, or less than about 0.8%, or less than about 0.5%, or less than about 0.3%, or about 0%, by total weight of the composition.

"Hair", as used herein, means mammalian hair including scalp hair, facial hair and body hair, particularly on hair on the human head and scalp.

"Cosmetically acceptable", as used herein, means that the compositions, formulations or components described are suitable for use in contact with human keratinous tissue without undue toxicity, incompatibility, instability, allergic response, and the like. All compositions described herein which have the purpose of being directly applied to keratinous tissue are limited to those being cosmetically acceptable.

"Derivatives", as used herein, includes but is not limited to, amide, ether, ester, amino, carboxyl, acetyl, acid, salt and/or alcohol derivatives of a given compound.

"Polymer", as used herein, means a chemical formed from the polymerisation of two or more monomers. The term "polymer" as used herein shall include all materials made by the polymerisation of monomers as well as natural polymers. Polymers made from only one type of monomer are called homopolymers. Polymers made from two or more different types of monomers are called copolymers. The distribution of the different monomers can be calculated statistically or block-wise—both possibilities are suitable for the present invention. Except if stated otherwise, the term "polymer" used herein includes any type of polymer including homopolymers and copolymers.

Today, if a manufacturer wants to sell a product in high gloss bottles, there is a single technical option that is commercially feasible. That is, the use is PET as the polymer of the bottle construction. This option comes with at 30% cost increase compared to the typical, conventional, lower gloss polyethylene bottles. High gloss bottles may also be made from High Density Polyethylene (HDPE), wherein the polymer is manufactured using a metallocene catalyst. However, these bottles are difficult to be used in high speed filling lines due to an unacceptable level of minor stops related to the natural tackiness of these resins. It is conventionally known in the art that polyethylene resin made with metallocene catalyst are more tacky than conventional polyethylene resin. The inventor has surprisingly found that the use of metallocene polyolefins (such as HDPE made using a metallocene catalyst) in combination with the appropriate slip agent, allows the delivery of high gloss bottles that will run reliably on high rate filling lines. Further improvement of the gloss can be achieved by polishing the corresponding molds. An important disadvantage of PET its higher material cost compared to HDPE. In addition, high volume PET bottle manufacturing is a two-step process; thus, its manufacturing costs are also more costly than those of HDPE, due to the extra staffing and equipment depreciation costs.

Slip Agent, sometimes also called slip aid or process aid or process additive, is a term used to describe a general class of materials that is added to a formulation to provide surface lubrication to the polymer, reducing the Coefficient-of-Friction (COF) of plastic containers. Slip agents overcome the resins' natural tackiness so they can move smoothly through converting and packaging equipment. Slip agents for masterbatches of LDPE, LLDPE, and other polyolefins offer a wider range of performance capabilities than in the past. These products range from the traditional fatty amides—the predominant grades conventionally used—to newer specialty, non-migratory grades that can meet such needs as the ability to work well at higher temperature, improve reliability, and hold coefficient of friction (COF) steady before and after manufacturing.

Non-limiting examples of slip agents include fatty acids such as saturated fatty acids, monounsaturated fatty acids, polyunsaturated fatty acids, fatty amides, such as oleamide, stearamide, behenamide, erucamide, n-(2-hydroxyethyl) erucamide, lauramide, N,N'-ethylene-bis-oleamide, N,N'-ethylene bissteamide, oleyl palmitamide, stearyl erucamide, tallow amide, arachidonylethanolamide, n-arachidonoyl maleimide, mixtures thereof, and derivatives thereof. Other slip agents include fluoroelastomers and polydimethylsiloxanes.

In further embodiments, the slip agent is commercially available having a trade name such as Ampacet 10090, Ampacet 102823 Process Aid, Ampacet 10919 from Ampacet, ATMER (Registered Trademark) SA from Unigema, Everberg, Belgium; ARMOSLIP (Registered trademark) from Akzo Nobel Polymer Chemicals, Chicago, M.; KEMAMIDE (Registered trademark) from Witco, Greenwich, Conn.; and CRODAMIDE (Registered trademark) from Croda, Edison, N.J. Some slip agents have been described in Zweifel Hans et al., "Plastics Additives Handbook," Hanser Gardner Publications, Cincinnati, Ohio, 5th edition, Chapter 8, pages 601-608 (2001), which is incorporated herein by reference.

The concentration of the slip agent in the composition can be from about 0.001 wt % to about 2 wt %, more preferably from about 0.01 wt % to about 0.3%, In one embodiment, the composition comprises Ampacet 10090 at a 4% content, which corresponds to a concentration of 2000 ppm or 0.2% of erucamide slip agent.

When using a slip agent such as Erucamide, one may need to wait a period of time before using the container on the filling line, in order to allow for the slip agent to bloom to the surface.

Without being bound by theory, this may help with preventing minor stops and lower the amount of scuffing and may potentially effect label adhesion. Slip masterbatches are available in formulations that allow for various diffusion rates, end-use temperatures and base resins.

Metallocene

A metallocene is a compound typically consisting of two cyclopentadienyl anions (Cp, which is $C_5H_5^-$) bound to a metal center (M) in the oxidation state II, with the resulting general formula $(C_5H_5)_2M$. Closely related to the metallocenes are the metallocene derivatives, e.g. titanocene dichloride, vanadocene dichloride. Certain metallocenes and their derivatives exhibit catalytic properties and are commonly used as catalysts for making thermoplastic polymers such as polyethylenes. For example, tougher and stronger, polyethylene resins that are clearer and easier to process than competing resins, are made using metallocene catalysts. These resins are useful for a wide range of products. Among them: Flexible packaging, pallet stretch wrap, collation shrink-films, general-purpose and carrier bags, heavy-duty bags, and food-packaging and agricultural films. Metallocene technology enables the making of improved polyethylene packages in terms of toughness and surface smoothness, clarity, and gloss.

The present invention uses new technology created by the metallocene polyethylene resins (medium density polyethylene (MDPE) and high density polyethylene (HDPE)). MDPE and HDPE resins offer greater stiffness, tensile strength and heat resistance than LDPE, LLDPE and single-site LLDPE resins. These properties are beneficial because they improve the printing, converting and filling of films and the gloss of packages. Typically, MDPE and HDPE resins have poor optics (haze, gloss) and poor toughness (impact, tear). Thus, they are not attractive for many consumer packaging applications. Thermoplastic resins used for packages include: polyolefins such as polyethylene (PE) and polypropylene (PP), polystyrene (PS), polyvinyl chloride (PVC), polylactic acid (PLA) or polyethylene terephthalate (PET).

As used herein and unless otherwise stated, "polyethylene" encompasses high density polyethylene (HDPE), low density polyethylene (LDPE), linear low density polyethylene (LLDPE), and ultra low density polyethylene (ULDPE). As used herein and unless otherwise stated, "polypropylene"

encompasses homopolymer polypropylene, random copolymer polypropylene, and block copolymer polypropylene. In one embodiment, the plastic resin material is high density polyethylene (HDPE). The plastic materials may be made from petrochemical-sourced monomers or bio-sourced monomers.

Other non-limiting examples of polymers include polylactic acid (PLA), polycaprolactones, polyamides, and others.

Various resins based on metallocene catalysts are designed to improve (a) mechanical strength, (b) heat sealing, (c) optical properties, (d) stiffness, and/or (e) processability.

Method—Polishing (FIG. 1)

Typically, bottle suppliers use 3 different levels of mold finish. Standard finish for HDPE is M5 or VDI 30 which has a 0.15 to 0.25 mm grit (240 ANSI grit) finish; standard finish for PP is Glass Bead Rough or VDI 29 which has a 0.10 to 0.20 mm grit (400 ANSI grit) finish; and a standard finish for PET is High Polish (near mirror). A nonstandard finish is also available of glass bead fine or VDI 27 which has a 0.04 to 0.07 mm grit (800 ANSI grit) finish and is one step below the High Polish finish. VDI is from the Society of German Engineers and stands for Verein Deutscher Ingenieure.

Method—Gloss

Gloss is an optical property of a surface to reflect light in a specular (mirror-like) direction. It is one parameter that is used to describe the visual appearance of an object. The factors that affect gloss are the refractive index of the material, the angle of incident light and the surface topography. Specular reflection is the amount of light reflected from a surface in an equal and opposite direction to the angle of light striking it (incident light).

In the present invention, gloss is measured by determining 60 degree Specular Gloss (ASTM TM D523-14) using a Rhopoint Novo-Curve Small area gloss meter.

The TM measures gloss by comparing the specular reflectance from the specimen to that from a black glass standard. Since specular reflectance depends also on the surface refractive index of the specimen, the measured gloss ratings change as the surface refractive index changes. In obtaining the visual gloss ratings, however, it is customary to compare the specular reflectances of two specimens having similar surface refractive indices.

Figure 2:
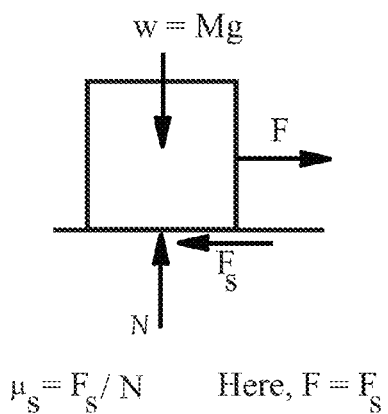
FIG. 2 is a model demonstrating the On the Verge of Motion Coefficient of Friction.
Figure 3A:
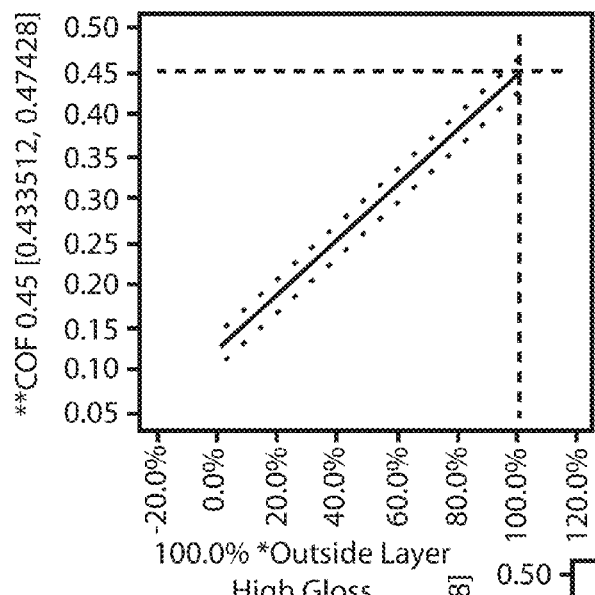
FIG. 3A is a graph showing % High Gloss vs., Coefficient of Friction (COF).
Figure 3B:
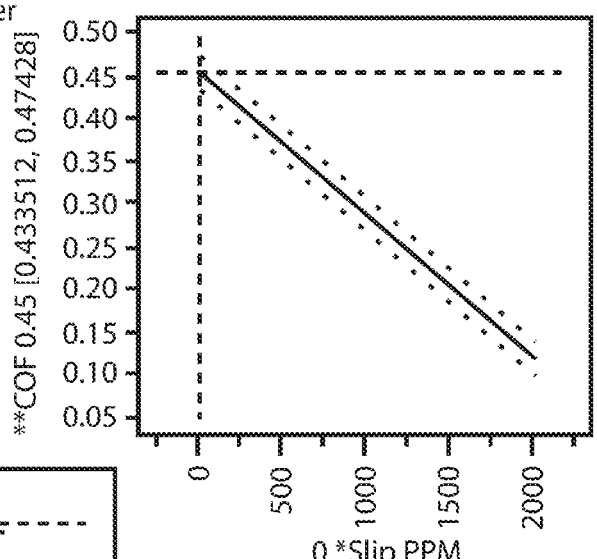
FIG. 3B is a graph showing Slip (PPM) vs., Coefficient of Friction (COF).
Figure 3C:
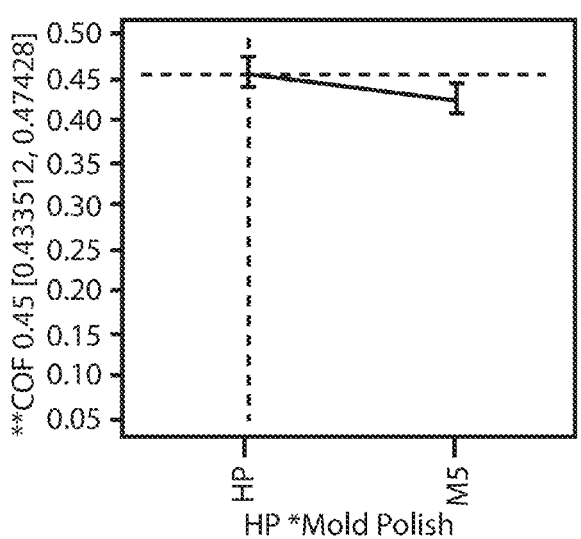
FIG. 3C is a graph showing Mold Finish vs., Coefficient of Friction (COF).
Figure 4A:
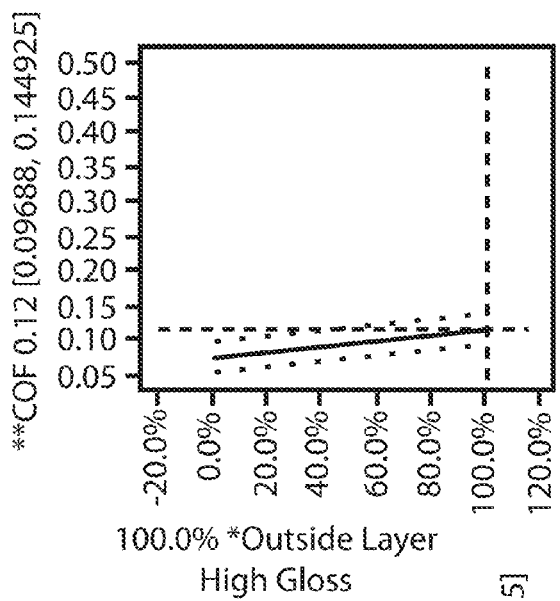
FIG. 4A is a graph showing % High Gloss vs., Coefficient of Friction (COF).
Figure 4B:
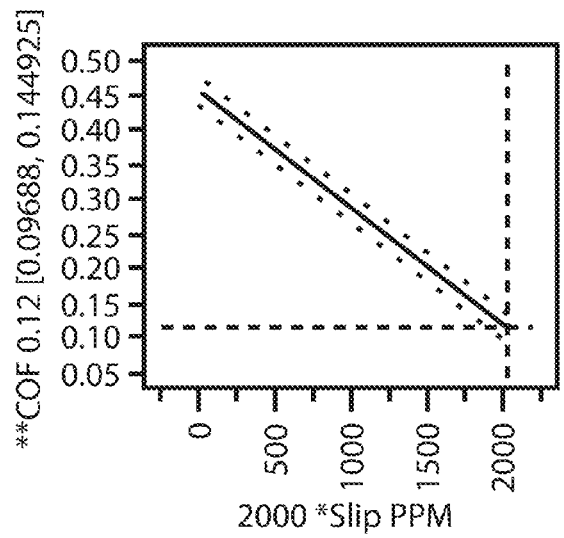
FIG. 4B is a graph showing Slip (PPM) vs., Coefficient of Friction (COF).
Figure 4C:
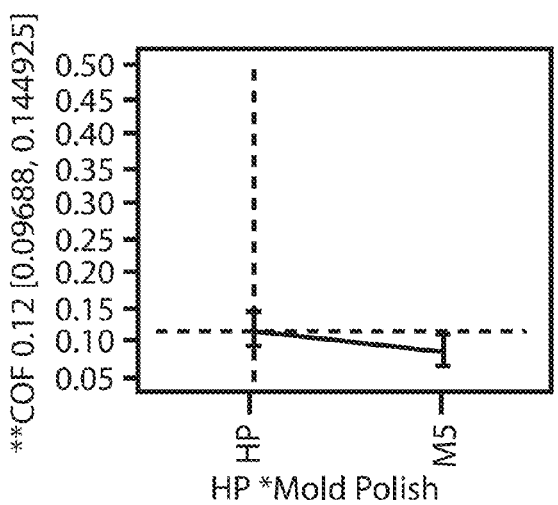
FIG. 4C is a graph showing Mold Finish vs., Coefficient of Friction (COF).

Coefficient of Friction (COF) Measurement (FIG. 2)

The tangent of the angle at which a block starts to slide down on an incline gives the coefficient of static friction between the bottom of the block and the top of the incline. Mathematically this is $\mu_s = \tan \theta_s$.

The reason is as follows: As demonstrated in FIG. 2, to determine the on the verge of motion Coefficient of Friction, $F_s$=Force of static friction, $\mu_s$=coefficient of static friction, N=Normal force or the force perpendicular to the contacting surfaces.

In the present invention, use one bottle as the block and one bottle of the same material of construction as the incline plane to determine the (on the verge on motion, FIG. 2) Coefficient of Friction. Prepare for this test by securing one bottle to end of a flat plane and then place a second bottle from the same lot in contact with the secured bottle. Slowly raise the inclined plane until the second bottle starts to slide. At the moment the second bottle starts to slide accurately measure the angle of the inclined plane versus the flat horizon. The COF is the tangent of the angle.

Method of Making

The following steps may be followed when making containers of the present invention during an EBM and/or IBM process:
1) The first step is to weigh out all the ingredients
2) Secondly, mix all the ingredients
3) Thirdly, transport the dry mixture to an extruder input
4) Feed the dry mixture into an extruder
5) Melt and mix the materials in the extruder via the application of appropriate heat and pressure For an EBM process, the process may include duplicating the process for each layer. The process may include combining the layers in a Die head and thus producing a parison tube. The process may further include enclosing the tube with the blow mold and blowing the tube into at bottle.

For IBM process, the process may include injecting the molten plastic into an injection chamber. The process may further include moving the preform to a blow chamber and blowing the final bottle.

In an embodiment of the present invention, a high production rate may be greater than 100 bottles per minute, in an embodiment greater than 150 bottles per minute, in a further embodiment greater than 200 bottles per minute.

Thermoplastic resins used for packages include: polyolefins such as polyethylene (PE) and polypropylene (PP), polystyrene (PS), polyvinyl chloride (PVC), polylactic acid (PLA) or polyethylene terephthalate (PET).

As used herein and unless otherwise stated, "polyethylene" encompasses high density polyethylene (HDPE), low density polyethylene (LDPE), linear low density polyethylene (LLDPE), and ultra low density polyethylene (ULDPE). As used herein and unless otherwise stated, "polypropylene" encompasses homopolymer polypropylene, random copolymer polypropylene, and block copolymer polypropylene. In one embodiment, the plastic resin material is high density polyethylene (HDPE). The plastic materials may be made from petrochemical-sourced monomers or bio-sourced monomers.

Other non-limiting examples of polymers include polylactic acid (PLA), polycaprolactones, polyamides, and others.

EXAMPLES

TABLE 1

| | | Resins by Percentage and Layer | | | | | | |
|---|---|---|---|---|---|---|---|---|
| | Layer Thicknesses | | Outside Layer | | outside layer | outside layer | outside layer | |
| Example | Outer Layer | Inner Layer | High Gloss | outside layer resin 1 grade | resin 1 percent | resin 2 grade | resin 2 percent | inside layer resin grade |
| EX1 | 25% | 75% | 0% | Ineos B54-25H-127 | 100% | none | 0% | Ineos B54-25H-127 |
| EX2 | 25% | 75% | 0% | Ineos B54-25H-127 | 100% | none | 0% | Ineos B54-25H-127 |

TABLE 1-continued

| | Layer Thicknesses | | Outside Layer | | outside layer | outside layer | outside layer | |
|---|---|---|---|---|---|---|---|---|
| Example | Outer Layer | Inner Layer | High Gloss | outside layer resin 1 grade | resin 1 percent | resin 2 grade | resin 2 percent | inside layer resin grade |
| EX3 | 15% | 85% | 0% | Ineos B54-25H-127 | 100% | none | 0% | Ineos B54-25H-127 |
| EX4 | 15% | 85% | 0% | Ineos B54-25H-127 | 100% | none | 0% | Ineos B54-25H-127 |
| EX5 | 25% | 75% | 50% | 50% Ineos B54-25H-127 | 50% | 50% Total BM 927 | 50% | Ineos B54-25H-127 |
| EX6 | 25% | 75% | 50% | 50% Ineos B54-25H-127 | 50% | 50% Total BM 927 | 50% | Ineos B54-25H-127 |
| EX7 | 25% | 75% | 100% | 100% Total BM 927 | 100% | none | 0% | Ineos B54-25H-127 |
| EX8 | 25% | 75% | 100% | 100% Total BM 927 | 100% | none | 0% | Ineos B54-25H-127 |
| EX9 | 15% | 85% | 100% | 100% Total BM 927 | 100% | none | 0% | Ineos B54-25H-127 |
| EX10 | 15% | 85% | 100% | 100% Total BM 927 | 100% | none | 0% | Ineos B54-25H-127 |
| EX11 | 15% | 85% | 0% | Ineos B54-25H-127 | 100% | none | 0% | Ineos B54-25H-127 |
| EX12 | 15% | 85% | 0% | Ineos B54-25H-127 | 100% | none | 0% | Ineos B54-25H-127 |
| EX13 | 25% | 75% | 0% | Ineos B54-25H-127 | 100% | none | 0% | Ineos B54-25H-127 |
| EX14 | 25% | 75% | 0% | Ineos B54-25H-127 | 100% | none | 0% | Ineos B54-25H-127 |
| EX15 | 15% | 85% | 50% | 50% Ineos B54-25H-127 | 50% | 50% Total BM 927 | 50% | Ineos B54-25H-127 |
| EX16 | 15% | 85% | 50% | 50% Ineos B54-25H-127 | 50% | 50% Total BM 927 | 50% | Ineos B54-25H-127 |
| EX17 | 15% | 85% | 100% | 100% Total BM 927 | 100% | none | 0% | Ineos B54-25H-127 |
| EX18 | 15% | 85% | 100% | 100% Total BM 927 | 100% | none | 0% | Ineos B54-25H-127 |
| EX19 | 25% | 75% | 100% | 100% Total BM 927 | 100% | none | 0% | Ineos B54-25H-127 |
| EX20 | 25% | 75% | 100% | 100% Total BM 927 | 100% | none | 0% | Ineos B54-25H-127 |
| EX21 | 20% | 80% | 0% | Ineos B54-25H-127 | 100% | none | 0% | Ineos B54-25H-127 |
| EX22 | 20% | 80% | 0% | Ineos B54-25H-127 | 100% | none | 0% | Ineos B54-25H-127 |
| EX23 | 20% | 80% | 50% | Ineos B54-25H-127 | 50% | Total BM 927 | 50% | Ineos B54-25H-127 |
| EX24 | 20% | 80% | 100% | Total BM 927 | 100% | none | 0% | Ineos B54-25H-127 |
| EX25 | 100% | 0% | 100% | DAK Laser + C (E60A) PET Resin | | | | none |

Notes:
TOTAL BM 927 is a high gloss Metallocene Polyethylene resin
INNEOS B54-25H-127 is a standard blow grade of Polyethylene resin
AMPACET 10090 is an Erucamide based Slip Agent
HP Polish grit of 0.01 to 0.02 mm is via a polishing cream
25 degree slide angle is maximum possible on equipment, angle and COF could be higher

TABLE 2

| | Slip Agent | | | | Mold Polish | | Results | | |
|---|---|---|---|---|---|---|---|---|---|
| | Outside | | | | | | Gloss Units | | |
| Example | Layer Slip Agent Additive | Let Down Ratio | Active PPM | Finish Name | Mold Polish Grit | | (60 deg GU) | Gloss Retention (%) | COF |
| EX1 | none | 0% | 0 | HP | 0.01-0.02 mm | | 16 | NA* | 0.16 |
| EX2 | none | 0% | 0 | M5 | 0.15-0.25 mm | | 17 | NA* | 0.13 |
| EX3 | Ampacet 10090 | 4.0% | 2000 | HP | 0.01-0.02 mm | | 16 | NA* | 0.06 |

TABLE 2-continued

| Example | Slip Agent Outside Layer Slip Agent Additive | Let Down Ratio | Active PPM | Mold Polish Finish Name | Mold Polish Grit | Results Gloss Units (60 deg GU) | Gloss Retention (%) | COF |
|---|---|---|---|---|---|---|---|---|
| EX4 | Ampacet 10090 | 4.0% | 2000 | M5 | 0.15-0.25 mm | 17 | NA* | 0.06 |
| EX5 | Ampacet 10090 | 4.0% | 2000 | HP | 0.01-0.02 mm | 73 | 44% | 0.09 |
| EX6 | Ampacet 10090 | 4.0% | 2000 | M5 | 0.15-0.25 mm | 63 | 43% | 0.07 |
| EX7 | Ampacet 10090 | 4.0% | 2000 | HP | 0.01-0.02 mm | 87 | 45% | 0.12 |
| EX8 | Ampacet 10090 | 4.0% | 2000 | M5 | 0.15-0.25 mm | 77 | 44% | 0.08 |
| EX9 | none | 0% | 0 | HP | 0.01-0.02 mm | 83 | 26% | 0.47 |
| EX10 | none | 0% | 0 | M5 | 0.15-0.25 mm | 71 | 32% | 0.36 |
| EX11 | none | 0% | 0 | HP | 0.01-0.02 mm | 16 | NA* | 0.06 |
| EX12 | none | 0% | 0 | M5 | 0.15-0.25 mm | 15 | NA* | 0.13 |
| EX13 | Ampacet 10090 | 4.0% | 2000 | HP | 0.01-0.02 mm | 21 | NA* | 0.06 |
| EX14 | Ampacet 10090 | 4.0% | 2000 | M5 | 0.15-0.25 mm | 19 | NA* | 0.05 |
| EX15 | none | 0% | 0 | HP | 0.01-0.02 mm | 62 | 51% | 0.27 |
| EX16 | none | 0% | 0 | M5 | 0.15-0.25 mm | 44 | 54% | 0.18 |
| EX17 | Ampacet 10090 | 4.0% | 2000 | HP | 0.01-0.02 mm | 86 | 46% | 0.11 |
| EX18 | Ampacet 10090 | 4.0% | 2000 | M5 | 0.15-0.25 mm | 74 | 44% | 0.09 |
| EX19 | none | 0% | 0 | HP | 0.01-0.02 mm | 85 | 46% | 0.47 |
| EX20 | none | 0% | 0 | M5 | 0.15-0.25 mm | 70 | 45% | 0.47 |
| EX21 | none | 0% | 0 | M5 | 0.15-0.25 mm | 20 | NA* | 0.12 |
| EX22 | none | 0% | 0 | VDI29 | 0.10-0.20 mm | 16 | NA* | ** |
| EX23 | none | 0% | 0 | VDI29 | 0.10-0.20 mm | 57 | ** | ** |
| EX24 | none | 0% | 0 | VDI29 | 0.10-0.20 mm | 65 | ** | ** |
| EX25 | none | 0% | 0 | HP | 0.01-0.02 mm | 105 | 46% | 0.34 |

AMPACET 10090 is an Erucamide based Slip Agent
*NA - examples do not have gloss retention (%) values due to low initial Gloss Unit values
** - no data collected Review of Results Coefficient of Friction 1. PET HP Control (EX 25) has a 0.34 COF and HDPE M5 Control (EX 21) has a 0.12 COF. The PET container does not have Lubristat and have run-ability (minor stop) issues on the bottle making and filling lines. The present invention has found that it may need a COF below 0.20 and above 0.05 for acceptable run-ability on high speed manufacturing lines.
2. The use of mPE (metallocene) significantly increases the COF of the bottle. The increase is proportional to the amount of mPE in the outer layer. At 100% mPE with no Slip Agent (EX 9, 19, & 20), the COF increases to more than 0.45.
3. The use of the slip agent significantly decreases the COF of the bottle. The COF decreases to about 0.12 at 100% mPE on the outside layer in the high polish mold (EX 7 & 17) and to 0.09 on the M5 (standard) mold polish (EX 8 & 18).
4. As expected the mold finish has a slight impact on COF. However, this impact is not significantly different.
5. The present invention has used the non-limiting example of the incline plane method (ASTM G115 & ASTM D4918) to determine the Static Coefficient of Friction of Bottle wall to Bottle wall surfaces. Using automated Tip Angle test equipment it is determines the angle where slip begins and determines the static COF from the Tangent of this angle after converting the slip angle into radians from degrees. This provides an approach that is simple, elegant, accurate and low cost.

Review of Results

Gloss (FIG. 5)

1. As demonstrated in FIG. 5, 60 degree Specular Gloss (ASTM D523-14) is measured using a Rhopoint Novo-Curve Small area gloss meter.
2. Control Data: PET HP (EX 25) is 105 Gloss Units (GU) and HDPE M5 (EX 21) is 20 GU.
3. FIG. 5 demonstrates a Gloss picture summary of White Containers.

Review of Results

Gloss Retention (Scuff Resistance)

ASTM D6279 is a standard test method for Rub Abrasion Mar Resistance of High Gloss Coatings. The TM calculates percent Gloss Retention by dividing Abraded Gloss by Unabraded Gloss. To implement the TM, a standard Sutherland rub equipment (Sutherland 2000 Rub Tester, from Danilee Co.) with a 10 pound weight is used, 400 grit sand paper and 5 rub cycles to generate the abrasion on a cut out wall section of the container. The gloss is measured in the same area on the cutout before and after the rub. Gloss is measured by determining 60 degree Specular Gloss (ASTM TM D523-14) using a Rhopoint Novo-Curve Small area gloss meter.

1. Control Data: PET HP (EX 25) has a Gloss Retention of 46%

2. On the thinner outer layer bottles with mPE (EX 9, 10, 17, & 18) the addition of a Slip Agent does significantly improve the gloss retention of the bottles in a range from below 32% (EX 9 & 10) to above 44% (EX 17 & 18). The slip agent does not significantly affect the gloss retention on the thicker mPE outer layer bottle (Ex. 7, 8, 19 and 20). However, the thinner mPE outer layer bottles are less costly and hence more desirable. In an embodiment of the present invention, a container may have a gloss retention of at least about 37%, in a further embodiment of at least 45%, and in a further embodiment of at least 50%.

In the examples, all concentrations are listed as weight percent, unless otherwise specified and may exclude minor materials such as diluents, filler, and so forth. The listed formulations, therefore, comprise the listed components and any minor materials associated with such components. As is apparent to one of ordinary skill in the art, the selection of these minors will vary depending on the physical and chemical characteristics of the particular ingredients selected to make the composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a low coefficient of friction (COF) high gloss polyolefin bottle by the following:
   a) adding a high gloss metallocene polyethylene during a manufacturing process on the outer layer of a container;
   b) adding a slip agent on the outer layer of the container wherein the slip agent is selected from the group consisting of saturated fatty acids, monounsaturated fatty acids, polyunsaturated fatty acids, fatty amides, fluoroelastomers, polydimethylsiloxanes and mixtures thereof;
wherein the container has a gloss range greater than 60 gloss units with a coefficient of friction of less than 0.25 and wherein the process is applied to a container having at least 2 layers.

2. A process according to claim 1 wherein a mold polish is less than 0.25 mm grit.

3. A process according to claim 1 wherein a mold polish is less than 0.2 mm grit.

4. A process according to claim 1 wherein a mold polish is less than 0.02 mm grit.

5. A process according to claim 1 wherein a mold polish is less than 0.07 mm grit.

6. The process of claim 1 wherein the bottle is made by injection blow molding, extrusion blow molding, injection stretch molding and mixture thereof.

7. The process according to claim 1 wherein the process is applied to a container having at least 2 layers and is extrusion blow molded.

8. The process according to claim 1 wherein the process further comprises a mold polish finish of less than 0.25 mm grit.

9. A process according to claim 1 wherein the process is applied to a container having at least 2 layers and is injection blow molded.

10. A process according to claim 9 wherein the process further comprises a mold polish finish of less than 0.25 mm grit.

11. The process of claim 1 wherein the production rate is greater than 100 bottles per minute.

12. The process of claim 1 wherein the container has a gloss retention of at least about 37%.

13. The process according to claim 1 wherein the fatty amides is selected from the group consisting of oleamide, stearamide, behenamide, erucamide, n-(2-hydroxyethyl) erucamide, lauramide, N,N'-ethylene-bis-oleamide, N,N'-ethylene bissteamide, oleyl palmitamide, stearyl erucamide, tallow amide, arachidonylethanolamide, n-arachidonoyl maleimide and mixtures thereof.

* * * * *